(12) United States Patent
Kuwayama et al.

(10) Patent No.: US 9,027,933 B2
(45) Date of Patent: May 12, 2015

(54) ENGINE

(71) Applicant: KUBOTA Corporation, Osaka-shi (JP)

(72) Inventors: Hiroki Kuwayama, Sakai (JP);
Takahiro Yamazaki, Sakai (JP); Yutaka Ishigaki, Sakai (JP); Hideyuki Koyama, Sakai (JP); Manabu Miyazaki, Sakai (JP); Yoshinori Tanaka, Sakai (JP); Keita Naito, Sakai (JP); Hidetaka Morinaga, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 185 days.

(21) Appl. No.: 13/760,296

(22) Filed: Feb. 6, 2013

(65) Prior Publication Data

US 2013/0207350 A1 Aug. 15, 2013

(51) Int. Cl.
*F16J 9/00* (2006.01)
*F02F 5/00* (2006.01)
*F16J 1/09* (2006.01)
*F16J 9/22* (2006.01)

(52) U.S. Cl.
CPC ... *F02F 5/00* (2013.01); *F16J 9/00* (2013.01); *F16J 1/09* (2013.01); *F16J 9/22* (2013.01)

(58) Field of Classification Search
CPC ..................................... F16J 9/20; F16J 9/067
USPC ......................................... 277/434, 435, 437
See application file for complete search history.

(56) References Cited

U.S. PATENT DOCUMENTS

2006/0260583 A1* 11/2006 Abi-Akar et al. .......... 123/193.4

FOREIGN PATENT DOCUMENTS

| EP | 2055426 A2 | 5/2009 |
|---|---|---|
| GB | 1246105 A | 9/1971 |
| JP | S58-165238 U | 11/1983 |
| JP | H04-87062 A | 3/1992 |
| JP | 10-054297 A | 2/1998 |
| JP | H11-182332 A | 7/1999 |
| JP | 2000-282950 A | 10/2000 |
| JP | 2005-171768 A | 6/2005 |
| WO | 2013037436 A1 | 3/2013 |

OTHER PUBLICATIONS

Extended European Search Report issued Mar. 28, 2014 in EP Application No. 13000440.1.
Office Action issued Nov. 18, 2014 in JP Application No. 2012-027533.

* cited by examiner

*Primary Examiner* — Gilbert Lee
(74) *Attorney, Agent, or Firm* — Panitch Schwarze Belisario & Nadel LLP

(57) ABSTRACT

An engine in which an oil consumption and a leakage of blow-by gas can be stably reduced for a long period of time. The engine includes a first land (3), a first ring groove (4), a second land (5), a second ring groove (6), a third land (7), a third ring groove (8), and a piston skirt (9) formed on a piston peripheral wall (1) in the above-recited order from a side of a piston head (2). A first pressure ring (10) is fitted in the first ring groove (4). A second pressure ring (11) is fitted in the second ring groove (6), an oil ring (12) fitted in the third ring groove (8), and an indentation (13) is formed at the second land (5).

8 Claims, 2 Drawing Sheets

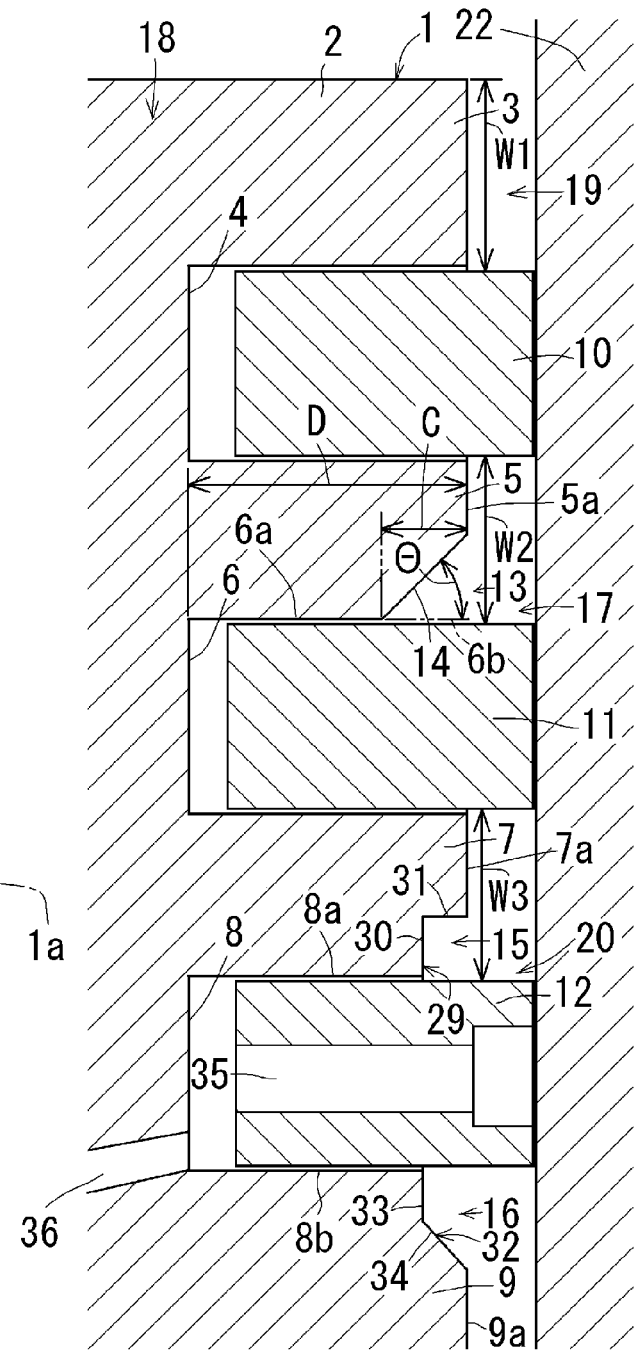

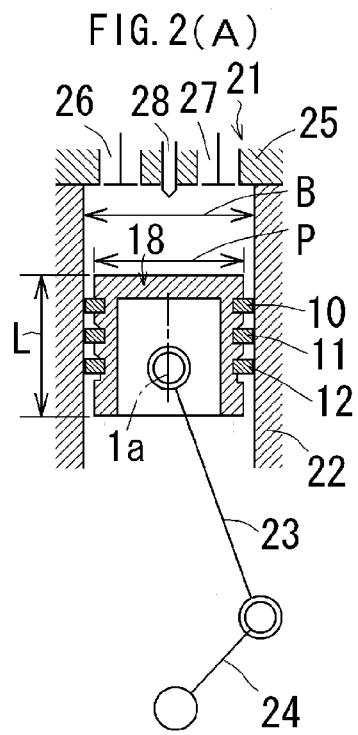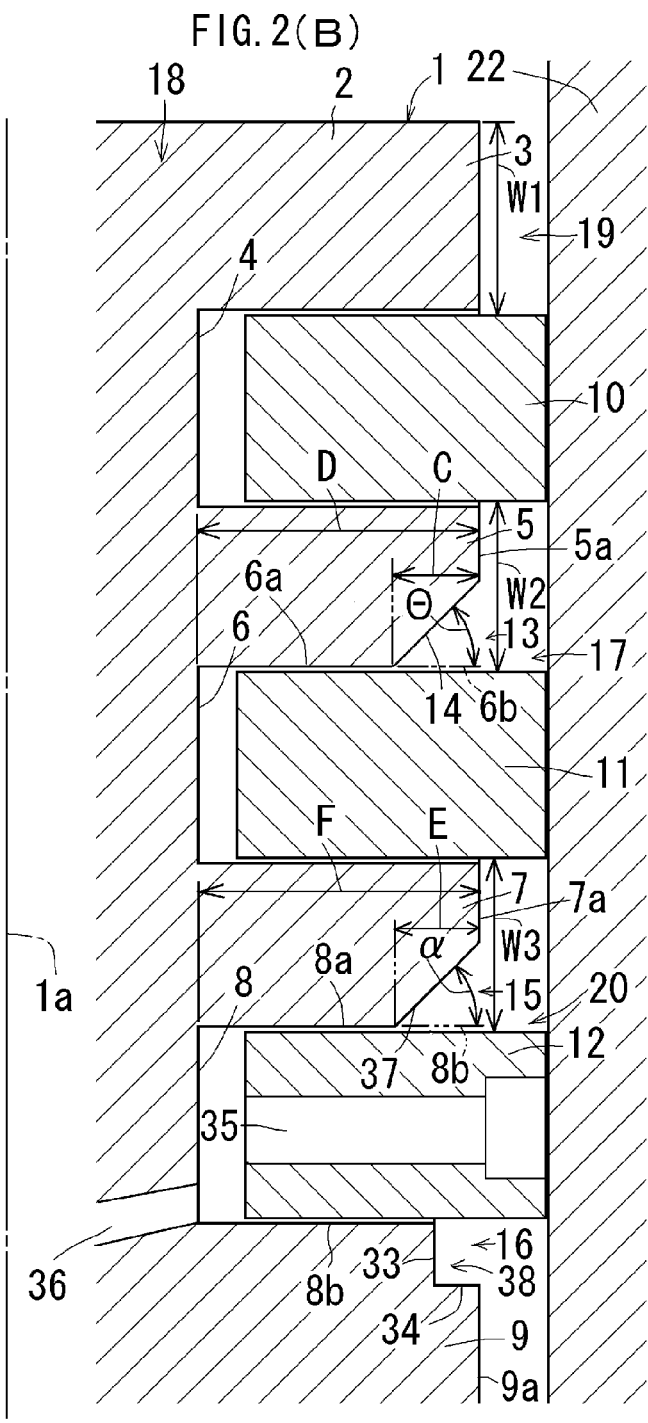

ENGINE

BACKGROUND OF THE INVENTION (1) Field of the Invention

The present invention relates generally to an engine and more particularly to an engine in which an oil consumption and a leakage of blow-by gas can be stably reduced even after operation for a long period of time.

(2) Description of Related Art

Conventionally, there has been proposed an engine including: a first land, a first ring groove, a second land, a second ring groove, a third land, a third ring groove, and a piston skirt formed on a peripheral wall of a piston in this order from a side of a piston head; a first pressure ring fitted in the first ring groove; a second pressure ring fitted in the second ring groove; an oil ring fitted in the third ring groove; and an indentation formed at the second land (see Japanese Patent Application Laid-Open No. 10-54297 (see FIGS. 2 and 4), for example).

This type of engine has advantages that a capacity of a space facing the second land increases by a capacity of the indentation of the second land and that variation in gas pressure in the space facing the second land during upward and downward movements of the piston can be suppressed.

However, this related art has a problem, because a groove is formed in an intermediate portion of an outer peripheral face of the second land and the groove forms the indentation of the second land.

<<Problems>>

After operation for a long period of time, an oil consumption amount and a leakage of blow-by gas increase.

Because the groove is formed in the intermediate portion of the outer peripheral face of the second land and the groove forms the indentation of the second land, rigidity of the second land is significantly reduced, the piston vibrates, and the first ring groove and the second ring groove are liable to be deformed and abnormally worn.

Therefore, though the indentation formed at the second land can suppress the variation in the gas pressure in the space facing the second land during the upward and downward movements of the piston, the vibration of the piston and the deformation and the abnormal wear of the ring grooves make behavior of the first oil ring and the second oil ring unstable and the oil consumption and the leakage of the blow-by gas increase after the operation for the long period of time due to degradation of sealing performance of the first oil ring and the second oil ring.

BRIEF SUMMARY OF THE INVENTION

An objective of a preferred embodiment of the present invention is to provide an engine in which an oil consumption and a leakage of blow-by gas can be stably reduced even after operation for a long period of time.

Invention defining matters of a preferred embodiment of the present invention are as follows.

As shown as an example in FIG. 1B, in an engine including: a first land (3), a first ring groove (4), a second land (5), a second ring groove (6), a third land (7), a third ring groove (8), and a piston skirt (9) formed on a piston peripheral wall (1) in this order from a side of a piston head (2); a first pressure ring (10) fitted in the first ring groove (4); a second pressure ring (11) fitted in the second ring groove (6); an oil ring (12) fitted in the third ring groove (8); and an indentation (13) formed at the second land (5).

As shown as an example in FIG. 1B, a corner at a boundary between an outer peripheral face (5a) of the second land (5) and a second-land-side end face (6a) of the second ring groove (6) is planed off with a tapered face (14) having a diameter reducing toward the second ring groove (6) and the tapered face (14) forms the indentation (13) of the second land (5).

<<Effects>>

It is possible to stably reduce an oil consumption and a leakage of blow-by gas even after operation for a long period of time.

As shown as an example in FIG. 1B, because the indentation (13) of the second land (5) is formed by the tapered face (14), a capacity of a space (17) facing the second land increases by a capacity of the indentation (13) formed at the second land (5) and it is possible to suppress variation in gas pressure in the space (17) facing the second land during upward and downward movements of the piston.

Moreover, because the corner at the boundary between the outer peripheral face (5a) of the second land (5) and the second-land-side end face (6a) of the second ring groove (6) is planed off with the tapered face (14) having the diameter reducing toward the second ring groove (6) and the tapered face (14) forms the indentation (13) of the second land (5), rigidity of the second land (5) is not significantly reduced and it is possible to suppress vibration of the piston (18) and deformation and abnormal wear of the ring groove.

In this way, vibration of the first pressure ring (10) and the second pressure ring (11) can be suppressed, high sealing performance of the first pressure ring (10) and the second pressure ring (11) can be maintained, and it is possible to reduce the oil consumption and the leakage of the blow-by gas even after operation for a long period of time.

It is possible to stably and sufficiently reduce the oil consumption and the leakage of blow-by gas even after operation for a long period of time.

As shown as an example in FIG. 1B, because an angle ($\Theta$) of the tapered face (14) to a cylinder-side imaginary extension line (6b) of the second-land-side end face (6a) of the second ring groove (6) is 30° to 60° and a percentage of a value (C/D) obtained by dividing a depth (C) of the tapered face (14) in a radial direction of the piston by a depth (D) of the second ring groove (6) in the radial direction of the piston is 20% to 30%, it is possible to stably and sufficiently reduce the oil consumption and the leakage of the blow-by gas even after operation for a long period of time.

If the angle ($\Theta$) of the tapered face (14) is excessively small or the percentage of the value (C/D) related to the depth (C) of the tapered face (14) is excessively small outside the optimum ranges, the capacity of the indentation (13) of the second land (5) becomes small, the capacity of the space (17) facing the second land does not sufficiently increase, it is impossible to effectively suppress the variation in the gas pressure in the space (17) facing the second land during the upward and downward movements of the piston, and the first pressure ring (10) and the second pressure ring (11) are liable to vibrate.

On the other hand, if the angle ($\Theta$) of the tapered face (14) is excessively large outside the optimum range, a large area of the second land (5) in the width (W2) direction is trimmed off to form the tapered face (14), rigidity of the second land (5) reduces, the piston (18) vibrates, the first ring groove (4) and the second ring groove (6) become liable to be deformed and worn, and the first pressure ring (10) and the second pressure ring (11) become liable to vibrate.

If the percentage of the value (C/D) related to the depth (C) of the tapered face (14) is excessively large outside the optimum range, an area of the second ring groove (6) for supporting the second pressure ring (11) becomes small and the second pressure ring (11) becomes liable to vibrate.

As described above, if the angle (Θ) of the tapered face (14) and the percentage of the value (C/D) related to the depth (C) of the tapered face (14) are outside the optimum ranges, at least one of the first pressure ring (10) and the second pressure ring (11) becomes liable to vibrate and it may be impossible to sufficiently reduce the oil consumption and the leakage of the blow-by gas in some cases due to degradation of the sealing performance of the first pressure ring (10) and/or the second pressure ring (11).

It is possible to stably and sufficiently reduce the oil consumption and the leakage of blow-by gas even after operation for a long period of time.

As shown as an example in FIG. 1B, because the percentage of the value (W2/B) obtained by dividing the width (W2) of the second land (5) by the diameter (B) of the cylinder bore is 6% to 15%, it is possible to stably and sufficiently reduce the oil consumption and the leakage of the blow-by gas even after operation for a long period of time.

If the percentage of the value (W2/B) related to the width (W2) of the second land (5) is excessively small outside the optimum range, the capacity of the space (17) facing the second land becomes small, it is impossible to effectively suppress the variation in the gas pressure in the space (17) facing the second land during the upward and downward movements of the piston, the first pressure ring (10) and the second pressure ring (11) become liable to vibrate, and it may be impossible to sufficiently reduce the oil consumption and the leakage of the blow-by gas in some cases due to degradation of the sealing performance of the first pressure ring (10) and the second pressure ring (11).

On the other hand, if the percentage of the value (W2/B) related to the width (W2) of the second land (5) is excessively large outside the optimum range, an overall length of the piston (18) may become greater than an appropriate value in some cases.

It is possible to sufficiently reduce the oil consumption and the leakage of the blow-by gas.

As shown as an example in FIG. 1B, because an indentation (15) of the third land (7) is formed at a boundary between an outer peripheral face (7a) of the third land (7) and a third-land-side end face (8a) of the third ring groove (8), a capacity of a space (20) facing the third land increases by a capacity of the indentation (15) of the third land (7), it is possible to suppress the variation in the gas pressure in the space (20) facing the third land during the upward and downward movements of the piston, it is possible to suppress the vibration of the second pressure ring (11) and the oil ring (12), and it is possible to sufficiently reduce the oil consumption amount and the leakage of the blow-by gas due to increase in the sealing performance of the second pressure ring (11) and the oil ring (12).

It is possible to sufficiently reduce the oil consumption.

As shown in FIG. 1(B), because an indentation (16) of the piston skirt (9) is formed at a boundary between an outer peripheral face (9a) of the piston skirt (9) and a piston-skirt-side end face (8b) of the third ring groove (8), it is possible to sufficiently reduce the oil consumption.

This is because part of oil scraped off by a lower portion of the oil ring (12) becomes likely to be introduced into the piston (18) through the indentation (16) of the piston skirt (9), an oil inlet (35), the third ring groove (8), and an oil outlet (36) and return into an oil pan (not shown) at a lower portion of the engine and the oil can be discharged quickly.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1A is a schematic sectional view of a cylinder and a piston of an engine according to a first preferred embodiment of the present invention;

FIG. 1B is an enlarged sectional view of an essential portion of the engine according to the first preferred embodiment of the present invention;

FIG. 2A is a schematic sectional view of a cylinder and a piston of an engine according to a second preferred embodiment of the present invention; and FIG. 2B is an enlarged sectional view of an essential portion of the engine according to the second preferred embodiment of the present invention.

DETAILED DESCRIPTION OF THE INVENTION

Hereinafter, preferred embodiments of the present invention will be described with reference to the drawings. FIGS. 1A and 1B are drawings for explaining an engine according to a first preferred embodiment of the present invention, and FIGS. 2A and 2B are drawings for explaining an engine according to a second preferred embodiment of the present invention. In each of the embodiments, a direct-injection diesel engine will be described.

First Preferred Embodiment

First, the engine according to the first preferred embodiment will be described.

As shown in FIG. 1A, in the engine (21), a piston (18) is fitted in a cylinder (22) to be able to move up and down and a crankshaft (24) is interlinked with the piston (18) with a connecting rod (23) interposed therebetween. A cylinder head (25) is mounted to an upper portion of the cylinder (22). In the cylinder head (25), an intake port (26), an exhaust port (27), and a fuel injection nozzle (28) are formed. A reference numeral (1a) in the drawings designates a center axis of the piston.

As shown in FIG. 1B, a first land (3), a first ring groove (4), a second land (5), a second ring groove (6), a third land (7), a third ring groove (8), and a piston skirt (9) are formed on a piston peripheral wall (1) in this order from a side of a piston head (2). A first pressure ring (10) is fitted in the first ring groove (4), a second pressure ring (11) is fitted in the second ring groove (6), an oil ring (12) is fitted in the third ring groove (8), and an indentation (13) is formed in the second land (5).

As shown in FIG. 1B, a corner at a boundary between an outer peripheral face (5a) of the second land (5) and a second-land-side end face (6a) of the second ring groove (6) is planed off with a tapered face (14) having a diameter reducing toward the second ring groove (6) and the tapered face (14) forms the indentation (13) of the second land (5).

As shown in FIG. 1B, an angle (Θ) of the tapered face (14) with respect to a cylinder-side imaginary extension line (6b)

of the second-land-side end face (6a) of the second ring groove (6) is 30° to 60° (preferably, 40° to 50°) and a percentage of a value (C/D) obtained by dividing a depth (C) of the tapered face (14) in a radial direction of the piston by a depth (D) of the second ring groove (6) in the radial direction of the piston is 20% to 30% and these are the optimum ranges of the angle (Θ) of the tapered face (14) and the percentage of the value (C/D) related to the depth of the tapered face (14).

As shown in FIG. 1B, a percentage of a value (W2/B) obtained by dividing a width (W2) of the second land (5) by a diameter (B) of a cylinder bore is 6% to 15% and this is the optimum range of the percentage of the value (W2/B) related to the width (W2) of the second land (5).

A reason why the ratio of the width (W2) of the second land (5) to the diameter (B) of the cylinder bore is calculated is that the diameter (B) of the cylinder bore provides indications of a size and combustion chamber pressure of the engine. The size and the combustion chamber pressure of the engine greatly affect the oil consumption of the engine and the leakage of the blow-by gas.

As shown in FIG. 1B, an indentation (15) in the third land (7) is formed at a boundary between an outer peripheral face (7a) of the third land (7) and a third-land-side end face (8a) of the third ring groove (8).

Furthermore, an indentation (16) of the piston skirt (9) is formed at a boundary between an outer peripheral face (9a) of the piston skirt (9) and a piston-skirt-side end face (8b) of the third ring groove (8).

The indentation (15) of the third land (7) is formed by a groove (29) in a shape of a right-angled L shape in a sectional view along the center axis (1a) of the piston, a back end face (30) of the indentation (15) is parallel to the center axis (1a) of the piston, and a face (31) of the indentation (15) and on a side of the piston head (2) is in an orientation orthogonal to the center axis (1a) of the piston.

The indentation (16) of the piston skirt (9) is formed by a groove (32) in a shape of an obtuse-angled L shape in a sectional view along the center axis (1a) of the piston, a back end face (33) of the indentation (16) is parallel to the center axis (1a) of the piston, and a face (34) of the indentation (16) and on an opposite side from the piston head (2) is formed as a tapered face having a diameter reducing toward the back end face (33).

As shown in FIG. 1B, an oil inlet (35) passing through the oil ring (12) is formed in the oil ring (12) along the radial direction of the piston and an oil outlet (36) passing through the piston peripheral wall (1) along the radial direction of the piston is formed in a back end of the third ring groove (8). Oil scraped off the cylinder (22) by the oil ring (12) is introduced into the piston (18) through the oil inlet (35), the third ring groove (8), and the oil outlet (36) and returns into an oil pan (not shown) at a lower portion of the engine.

As compared with comparative engines outside the above-described optimum ranges according to the first preferred embodiment, exemplary engines in the optimum ranges obtained the following satisfactory experimental results with regard to the oil consumption and the leakage of the blow-by gas.

A first experiment was conducted by using a vertical water-cooled in-line four-cylinder direct-injection diesel engine with a cylinder bore diameter (B) of 87 mm, a maximum diameter (P) of a piston head (2) of 86.5 mm, a minimum diameter of the piston head (2) of 86.46 mm, a piston axial length (L) of 80 mm, and a piston stroke of 102.4 mm at 20° C. and by running the engine at an engine speed of 2700 rpm and with a load factor of 80% for 200 hours. The load factor was calculated with respect to a load factor of 100% representing a rated load at a rated speed at which a maximum output can be obtained.

As the exemplary engines, a minimum-value exemplary engine using respective minimum values in the above-described optimum ranges, a maximum-value exemplary engine using respective maximum values, and an intermediate-value exemplary engine using respective intermediate values were produced.

As the comparative engines, engines without tapered faces (14) which exist in the respective exemplary engines were produced.

They were compared to each other and it was found that oil consumptions reduced by about 30% and leakages of blow-by gas reduced by about 35% in the respective exemplary engines from the respective comparative engines. No major degradation of performance was found after the operation for 200 hours.

In the minimum-value exemplary engine, an angle (Θ) of the tapered face (14) was 30°, a percentage of a value (C/D) related to a depth (D) in a piston diameter direction was 20%, and a percentage of a value (W2/B) related to a width (W2) of a second land (5) was 6%.

In the maximum-value exemplary engine, an angle (Θ) of the tapered face (14) was 60°, a percentage of a value (C/D) related to a depth (D) in a piston diameter direction was 30%, and a percentage of a value (W2/B) related to a width (W2) of a second land (5) was 11%.

In the intermediate-value exemplary engine, an angle (Θ) of the tapered face (14) was 45°, a percentage of a value (C/D) related to a depth (D) in a piston diameter direction was 25%, and a percentage of a value (W2/B) related to a width (W2) of a second land (5) was 8.5%.

In each of the engines, a percentage of a value (W1/B) obtained by dividing a width (W1) of a first land (3) by the cylinder bore diameter (B) was 13%. A percentage of a value (W3/B) obtained by dividing a width (W3) of a third land (7) by the cylinder bore diameter (B) was 4%.

Comparative engines in which only the taper angles (Θ) in the respective exemplary engines were changed to 25° (smaller than the lower limit, 30° in the appropriate range) were produced.

The respective exemplary engines and the respective comparative engines were compared to each other and it was found that the oil consumptions reduced by about 15% and the leakages of blow-by gas reduced by about 17% in the respective exemplary engines from the respective comparative engines.

Comparative engines in which only the taper angles (Θ) in the respective exemplary engines were changed to 65° (larger than the upper limit, 60° in the appropriate range) were produced.

The respective exemplary engines and the respective comparative engines were compared to each other and it was found that the oil consumptions reduced by about 15% and the leakages of blow-by gas reduced by about 17% in the respective exemplary engines from the respective comparative engines.

Comparative engines in which only the percentages of the values (C/D) related to the depths (C) of the tapered faces (14) in the respective exemplary engines were changed to 10% (lower than the lower limit, 20% in the appropriate range) were produced.

The respective exemplary engines and the respective comparative engines were compared to each other and it was found that the oil consumptions reduced by about 20% and the leakages of blow-by gas reduced by about 23% in the respective exemplary engines from the respective comparative engines.

Comparative engines in which only the percentages of the values (C/D) related to the depths (C) of the tapered faces (14) in the respective exemplary engines were changed to 40% (higher than the upper limit, 30% in the appropriate range) were produced.

The respective exemplary engines and the respective comparative engines were compared to each other and it was found that the oil consumptions reduced by about 20% and the leakages of blow-by gas reduced by about 23% in the respective exemplary engines from the respective comparative engines.

Comparative engines in which only the percentages of the values (W2/B) related to the widths (W2) of the second land (5) in the respective exemplary engines were changed to 5% (lower than the lower limit, 6% in the appropriate range) were produced.

The respective exemplary engines and the respective comparative engines were compared to each other and it was found that the oil consumptions reduced by about 15% and the leakages of blow-by gas reduced by about 17% in the respective exemplary engines from the respective comparative engines.

Moreover, it was found that an overall length of the piston (18) exceeds an appropriate length if only the percentages of the values (W2/B) related to the widths (W2) of the second land (5) in the respective exemplary engines are changed to 12% (higher than 11%, the upper limit value in the appropriate range).

Preferably, the percentage of the value (W1/B) obtained by dividing the width (W1) of the first land (3) by the cylinder bore diameter (B) is set to 8% or a higher value and the percentage of the value (W3/B) obtained by dividing the width (W3) of the third land (7) by the cylinder bore diameter (B) is set to 2% or a higher value. Under these percentages, capacities of a space (19) facing the first land and a space (20) facing the third land become small, the oil and the blow-by gas become liable to pass through the space (19) facing the first land and the space (20) facing the third land, and it may be impossible to effectively reduce the oil consumption and the leakage of the blow-by gas in some cases.

Preferably, the sum of the percentage of the value (W1/B) related to the width (W1) of the first land (3), the percentage of the value (W2/B) related to the width (W2) of the second land (5), and the percentage of the value (W3/B) related to the width (W3) of the third land (7) is 28% or lower. If the sum exceeds this percentage, the overall length of the piston (18) may become greater than the appropriate value in some cases.

A second experiment was conducted by using a vertical water-cooled in-line four-cylinder indirect-injection diesel engine with a cylinder bore diameter (B) of 78 mm, a maximum diameter (P) of a piston head (2) of 77.5 mm, a minimum diameter of the piston head (2) of 77.46 mm, a piston axial length (L) of 70 mm, and a piston stroke of 78.4 mm at 20° C. and by running the engine at an engine speed of 3000 rpm and with a load factor of 80% for 200 hours.

The second experiment was conducted by using exemplary engines and comparative engines adjusted to have the same dimensional ratios as in the first experiment and equivalent experimental results to those of the first experiment were obtained.

Second Preferred Embodiment

Next, an engine according to the second preferred embodiment will be described.

As shown in FIG. 2(B), in the engine according to the second preferred embodiment, a corner at a boundary between an outer peripheral face (7a) of a third land (7) and a third-land-side end face (8a) of a third ring groove (8) is planed off with a tapered face (37) having a diameter reducing toward the third ring groove (8) and the tapered face (37) forms an indentation (15) of the third land (7).

As shown in FIG. 2B, an angle ($\alpha$) of the tapered face (37) with respect to a cylinder-side imaginary extension line (8b) of the third-land-side end face (8a) of the third ring groove (8) is 30° to 60° (preferably, 40° to 50°) and a percentage of a value (E/F) obtained by dividing a depth (E) of the tapered face (37) in a radial direction of the piston by a depth (F) of the third ring groove (8) in the radial direction of the piston is 20% to 30% and these are the optimum ranges of the angle ($\alpha$) of the tapered face (37) and the percentage of the value (E/F) related to the depth of the tapered face (37).

Similarly to the tapered face (14) of the second land (5), the tapered face (37) of the third land (7) in these optimum ranges can stably and sufficiently reduce the oil consumption and the leakage of the blow-by gas even after the operation for a long period of time. Outside these optimum ranges, a second pressure ring (11) and an oil ring (12) become liable to vibrate and it may be impossible to sufficiently reduce the oil consumption and the leakage of the blow-by gas due to degradation of sealing performance of the second pressure ring (11) and the oil ring (12) in some cases.

In the engine according to the second preferred embodiment, as in the first preferred embodiment, an indentation (16) of a piston skirt (9) is formed at a boundary between an outer peripheral face (9a) of the piston skirt (9) and a piston-skirt-side end face (8b) of the third ring groove (8). However, a shape of the indentation (16) of the piston skirt (9) is different from that in the first preferred embodiment and is formed by a right-angled L-shaped groove (38) in a sectional view along a center axis (1a) of a piston. A back end face (33) of the indentation (16) is parallel to the center axis (1a) of the piston and a face (34) of the indentation (16) and on an opposite side from a piston head (2) is in an orientation orthogonal to the center axis (1a) of the piston.

The other structures are the same as those in the first preferred embodiment and the same components as those in the first preferred embodiment are provided with the same reference numerals in FIGS. 2A and 2B.

The same experiments as those on the engine according to the first preferred embodiment were conducted on the engine according to the second preferred embodiment and equivalent results to those in the first preferred embodiment were obtained.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. An engine comprising:
a first land, a first ring groove, a second land, a second ring groove, a third land, a third ring groove, and a piston skirt formed on a piston peripheral wall in the above-recited order from a side of a piston head;
a first pressure ring fitted in the first ring groove;
a second pressure ring fitted in the second ring groove;
an oil ring fitted in the third ring groove; and
an indentation formed at the second land, wherein a corner at a boundary between an outer peripheral face of the second land and a second-land-side end face of the second ring groove is planed off with a tapered face having a diameter reducing toward the second ring groove and the tapered face forms the indentation of the second land, and an angle of the tapered face to a cylinder-side imaginary extension line of the second-land-side end face of the second ring groove is 30° to 60° and a percentage of a value obtained by dividing a depth of the tapered face in a radial direction of a piston by a depth of the second ring groove in the radial direction of the piston is 20% to 30%.

2. The engine according to claim 1, wherein a percentage of a value obtained by dividing a width of the second land by a cylinder bore diameter is 6% to 11%.

3. The engine according to claim 2, further comprising an indentation at the third land and formed at a boundary between an outer peripheral face of the third land and a third-land-side end face of the third ring groove.

4. The engine according to claim 2, further comprising an indentation at the piston skirt and formed at a boundary between an outer peripheral face of the piston skirt and a piston-skirt-side end face of the third ring groove.

5. The engine according to claim 1, further comprising an indentation at the third land and formed at a boundary between an outer peripheral face of the third land and a third-land-side end face of the third ring groove.

6. The engine according to claim 5, further comprising an indentation at the piston skirt and formed at a boundary between an outer peripheral face of the piston skirt and a piston-skirt-side end face of the third ring groove.

7. The engine according to claim 6, wherein a percentage of a value obtained by dividing a width of the second land by a cylinder bore diameter is 6% to 11%.

8. The engine according to claim 1, further comprising an indentation at the piston skirt and formed at a boundary between an outer peripheral face of the piston skirt and a piston-skirt-side end face of the third ring groove.

\* \* \* \* \*